(12) United States Patent
Davies et al.

(10) Patent No.: US 10,782,795 B2
(45) Date of Patent: Sep. 22, 2020

(54) MECHANICAL BUTTON THAT ACTIVATES A COMPUTER TOUCH SCREEN WITHOUT CAUSING DAMAGE TO THE TOUCH SCREEN

(71) Applicants: Richard Bonar Davies, Sandy, UT (US); Christopher Allen Davies, Sandy, UT (US)

(72) Inventors: Richard Bonar Davies, Sandy, UT (US); Christopher Allen Davies, Sandy, UT (US)

(*) Notice: Subject to any disclaimer, the term of this patent is extended or adjusted under 35 U.S.C. 154(b) by 0 days.

(21) Appl. No.: 16/501,983

(22) Filed: Jul. 15, 2019

(65) Prior Publication Data

US 2020/0019248 A1    Jan. 16, 2020

Related U.S. Application Data

(63) Continuation-in-part of application No. 15/609,774, filed on May 31, 2017, now abandoned.

(51) Int. Cl.
*G06F 3/041* (2006.01)
*G06F 3/02* (2006.01)

(52) U.S. Cl.
CPC ............ *G06F 3/0227* (2013.01); *G06F 3/041* (2013.01)

(58) Field of Classification Search
CPC .................................................... G06F 3/0414
USPC ........................................................ 715/702
See application file for complete search history.

(56) References Cited

U.S. PATENT DOCUMENTS

| | | | | |
|---|---|---|---|---|
| 6,517,480 B1* | 2/2003 | Krass | ........................ | A61B 5/16 600/300 |
| 6,788,292 B1* | 9/2004 | Nako | ..................... | G06F 1/1643 345/173 |
| 7,417,625 B2* | 8/2008 | Morris | ................... | G06F 1/1616 345/156 |
| 7,643,008 B2* | 1/2010 | Uusitalo | ............. | G06F 3/04886 178/18.01 |
| 9,465,446 B2* | 10/2016 | Kaiser | ...................... | G06F 3/021 |
| 9,504,380 B1* | 11/2016 | Quaid | ..................... | A61B 3/085 |
| 10,592,004 B1* | 3/2020 | Sun | ........................ | G06F 3/0238 |
| 2004/0183834 A1* | 9/2004 | Chermesino | ........ | G06F 3/04886 715/773 |
| 2005/0071778 A1* | 3/2005 | Tokkonen | ............. | G06F 1/1626 715/822 |
| 2005/0248549 A1* | 11/2005 | Dietz | ....................... | G06F 3/016 345/179 |
| 2006/0173552 A1* | 8/2006 | Roy | .................... | A63B 71/0009 623/24 |

(Continued)

*Primary Examiner* — Reza Nabi

(57) ABSTRACT

A mechanical button that is adjacent to a touch screen that allows for the forceful activation of a computer touch screen by a user without such force of activation of the disclosed button by the user causing damage to the touch screen. This disclosed button is comprised of at least 2 sections that can be caused to compress relative to one another along their common linier axis and the disclosed button is supported by a structure other than the face of the touch screen. The disclosed button, unlike a lighted area on a flat touch screen, provides the user with tactile feedback when the button is activated and the disclosed button further creates a three dimensional visual target that facilitates the user's ability to see the button in their peripheral field of vision, rather than seeing only a lighted area on a flat touch screen.

3 Claims, 4 Drawing Sheets

(56) References Cited

U.S. PATENT DOCUMENTS

| | | | |
|---|---|---|---|
| 2006/0187211 A1* | 8/2006 | Uusitalo | G06F 3/04886 345/169 |
| 2009/0313542 A1* | 12/2009 | Cruz-Hernandez | G06F 3/016 715/702 |
| 2011/0074560 A1* | 3/2011 | Pfau | H04M 1/23 340/407.2 |
| 2011/0089007 A1* | 4/2011 | Fruhauf | H01H 13/705 200/341 |
| 2011/0224665 A1* | 9/2011 | Crosby | A61N 1/0551 606/33 |
| 2011/0274476 A1* | 11/2011 | Preliasco | H02J 7/0042 400/578 |
| 2012/0108909 A1* | 5/2012 | Slobounov | G16H 50/30 600/300 |
| 2012/0238831 A1* | 9/2012 | Benford | A61B 5/165 600/300 |
| 2012/0330178 A1* | 12/2012 | Kraft | A61B 5/1124 600/544 |
| 2013/0321291 A1* | 12/2013 | Sim | G06F 3/048 345/173 |
| 2014/0111449 A1* | 4/2014 | Lee | G06F 3/0416 345/173 |
| 2014/0124121 A1* | 5/2014 | Wang | G06F 3/041 156/64 |
| 2015/0015476 A1* | 1/2015 | Yanev | G06F 3/0487 345/156 |
| 2015/0061901 A1* | 3/2015 | Casparian | H01H 13/705 341/22 |
| 2015/0068934 A1* | 3/2015 | Armstrong | H04B 1/3888 206/320 |
| 2015/0076188 A1* | 3/2015 | Venida | A45C 11/00 224/191 |
| 2015/0094621 A1* | 4/2015 | Alberts | G06F 3/044 600/595 |
| 2015/0094622 A1* | 4/2015 | Curtiss | A61B 5/162 600/595 |
| 2015/0170537 A1* | 6/2015 | Super | G09B 7/00 434/236 |
| 2015/0238848 A1* | 8/2015 | Kuhn | A63F 1/12 273/149 R |
| 2015/0360069 A1* | 12/2015 | Marti | A63B 23/03508 482/6 |
| 2016/0015289 A1* | 1/2016 | Simon | A61B 5/1103 600/301 |
| 2016/0147358 A1* | 5/2016 | Kennedy | G06F 3/0416 345/173 |
| 2016/0161404 A1* | 6/2016 | Marshall | B01L 3/50255 435/34 |
| 2016/0233034 A1* | 8/2016 | Sheng | H01H 13/063 |
| 2017/0281946 A1* | 10/2017 | Katnani | A61N 1/0534 |
| 2018/0348939 A1* | 12/2018 | Davies | G06F 3/016 |
| 2018/0348981 A1* | 12/2018 | Devies | H04N 5/33 |
| 2019/0304011 A1* | 10/2019 | Mossoba | H04N 21/4753 |
| 2020/0019248 A1* | 1/2020 | Davies | G06F 3/0393 |

* cited by examiner

MECHANICAL BUTTON THAT ACTIVATES A COMPUTER TOUCH SCREEN WITHOUT CAUSING DAMAGE TO THE TOUCH SCREEN

BACKGROUND OF THE INVENTION

The present invention presents a unique mechanical button to be used in conjunction with a computer device touch screen where the disclosed button can be forcibly struck by a user to activate the computer touch screen, without causing damage to the touch screen.

While there are currently available 'add-on' Touch Screen Buttons designed to be utilized with a touch screen video game and other touch screen devices (attached by suction cup to the face of the touch screen), none of these presently available touch screen buttons have a means to limit the force that these buttons transfer to the face of the touch screen when forcibly pressed or struck by the user. While such herein disclosed capability to protect the touch screen may not be needed or useful in video gaming applications; such a feature is necessary in touch screen applications where the touch screen is forcibly activated when the used strikes a 3 dimensional button, causing the button to contact the touch screen. Such an application is more specifically described below in [0008].

Examples of Currently Available Touch Screen Buttons with Links to Published Descriptions.

Explore Scientific; Springdale, Ark. 72762 https://explorescientificusa.com/search?q=Touch+Screen+Buttons SteelSeries; Chicago, Ill. 60661 https://www.google.com/search?q=Steel+Series+touchscreen+gaming+controls&tbm=isch&source=univ&client=firefox-b-1-d&sa=X&ved=2ahUKEwia1uqVvPjiAhVP5awKHbVFCUUQsAR6BAgFEAE&biw=1280&bih=606#imgrc=d1hJudL2XbKwpM:

Vakili; China; Touch Screen Joypad Controller https://www.chinabrands.com/buy/article-2708143.html While the herein disclosed mechanical button invention is applicable to cause the activation of any touch screen device where the touch screen may be subject to damage from a forcible strike to activate such a device, the herein disclosed invention has particular application and value when used in conjunction with, but not limited to standard, commercially available, flat touch screen computer monitor touch screen based visual-motor, neuro-cognitive evaluation and sport performance training devices and other devices incorporating a touch screen user interface. Such large touch screen devices are widely used in sports performance training and evidence based medical rehabilitation, benefiting from the incorporation of three dimensional buttons over simple direct user contact with a touch screen; and these such devices are often struck, by the user, with great force.

These above noted visual-motor, neuro-cognitive evaluation and sport performance training devices measure 'reaction time' by recording how fast a user can respond to a visual and/or auditory que, generated by the device, by striking a specific target on the device when the target is illuminated. This quest for the user to achieve ever faster reaction times incentivizes the user to strike the target button as fast as possible, creating the potential for creating a very significant striking force; a force that if transferred to the face of the touch screen can damage the touch screen.

There are a number of visual-motor and neuro-cognitive evaluation and training devices being used in medically and sport directed rehabilitation programs for persons recovering from stroke, traumatic brain injury (TBI), sport concussion, neuro surgery and other conditions or events affecting visual-motor performance.

While not incorporating the use of a touch screen, the most widely used Visual-Motor Reaction Device is the Dynavision™ Device; currently manufactured and distributed by Dynavision International, LLC, in West Chester, Ohio. There are more than 1,800 Dynavision™ devices in use throughout the U.S. and in more than 20 foreign countries.

The Dynavision™ has created the standard for all such large board, Visual-Motor Reaction Training and Evaluation devices. The overall operation of these devices is controlled by an integral Controlling Computer (not specifically shown in the Figures provided with this application, but here-in described for general reference, as the specific operation of the Controlling Computer of such devices is well understood by persons skilled in use of such devices, and is not relevant to the operation of the here-in disclosed invention). This Controlling Computer is programmed to turn on selected target light(s) and turn off the illumined light(s) when the illuminated light times-out or is pressed by the user; and then illuminate another light(s) on the board; measuring, recording and displaying (on the Reaction Training Device) the user's reaction time in responding to the illumination of a light or lights.

The Dynavision™ device (as noted above, does not incorporate the use of a Touch Screen) is comprised of a large 4'×4' board with a plurality of lighted mechanical buttons (64 buttons), each wired into circuits and mounted on the face of the 4'×4' board. The large face size of the board and the raised, illuminated buttons are important to the function of the device to challenge the entire visual field of the user and provide tactile feedback as he/she stands (or sits) in front of the device and presses (or hits) the raised switches as they randomly light-up. When an illuminated button is pressed, that light turns off and another random light turns on. The device keeps score of how fast and accurately the user can respond to the lights. The rugged design and construction of the Dynavision™ device reflects the need for this device to withstand very forceful strikes to the illuminated buttons on the face of the device.

There are other 'large faced' visual motor reaction devices that are somewhat similar in their application to the Dynavision™ device, such as the Vision Coach™ Trainer (Perceptual Testing, Inc., California) and the BITS™ therapy system (Bioness, Inc., California). While these devices do have a large face area populated with individual points or dots of light that challenge a wide visual field, similar to the Dynavision™ device; the Vision Coach® achieves the lighted targets by randomly illuminating the face of the board behind 'one dimensional' membrane switches that do not substantially protrude from the face of the device or provide tactile feed back to the user; as do Dynavision's™ illuminated three dimensional mechanical push button switches.

Both the Dynavision™ and Vision Coach™ Devices are purpose designed and built for their intended use, such that, once designed the entire board, electronics and associated wiring of each switch must be separately fabricated, including attaching multiple wires to each of the many illuminated button switches located on the board.

By comparison, the Bioness BITS™ device is created using a commercially available large, flat touch screen activated computer monitor. The BITS™ system's controlling computer is programmed to create light 'spots' on the touch screen that the user is instructed to 'touch' to turn off the light, as another lighted 'spot' in a different location turns on. This use of a touch screen results in a valuable manufacturing and cost related advantage of this BITS™ device over the Dynavision™ and Vision Coach™ devices, as the individual mechanical lighted switches used in these devices and all of the related wiring is eliminated and replaced by simply programming illuminated dots/circles of light to appear on the touchscreen, that are programmed to turn-off when touched by the user.

While this BITS™ device and its use of a commercially available touchscreen activated computer monitor as the user interface does eliminate the need for a significant number of parts, labor and related manufacturing costs; the BITS™ System with its flat touch screen design, when compared to the operating standard set by Dynavision™, loses all of the important benefits of raised lighted, three dimensional button targets and the tactical feedback to the user when the user touches only the lighted dot on the touchscreen rather than the raised, lighted mechanical button of the Dynavision™. Raised, lighted targets (as per the Dynavision), in addition to being the accepted and expected standard in clinical and sports performance training for visual-motor, neuro-cognitive evaluation, these specific features are of particular importance in evaluating and training a user's full range of peripheral vision; as a person's peripheral vision is particularly important to athletes, and to military and law enforcement personnel in tactical situations.

Further to the differences between the Dynavision® type device with raised, illuminated switches and a Bits™ type touch screen based system, the user must touch or press the glass touchscreen of the BITS® System with care. A hard strike to the screen with a fist, heal of the hand, knuckle or an object can damage the monitor; and such strikes are common occurrences when the Dynavision™ is used by athletes and in tactical training, as the users compete to achieve faster reaction times and higher scores. Further, many common touchscreen monitors will not respond to a touch by an object, e.g., a ball or lacrosse stick being held by the user of large touch screen based device; as these touch screens commonly require contact with a part of the user's body to cause a change in the electrical capacitance being sensed by the screen when—and where it is touched.

For the above reasons, the touchscreen computer monitor based devices (such as the BITS®) are not well suited for use by many athletes or tactical personnel who commonly hit the board with great force and with a hand or objects, or by persons recovering from stroke or brain injury that have lost the manual dexterity to touch a specific lighted spot on the screen with a single finger, or in industrial and military applications where the user must respond to a situation by quickly and confidently striking a button to positively execute a critical command, such as; STOP or FIRE.

Further, the presences of an illuminated, raised, 3 dimensional button (as per Dynavision™) is; i) better and more reliably seen and located by the user in their peripheral field of vision than the illumination of a simple light spot on a touch screen;
ii) The use of illuminated, raised, 3 dimensional buttons require that the user strike the specific location of the illumined button, rather than simply swiping or wiping their hand over a general area of a touch screen device where a lighted spot on the touch screen is illuminated.

The Problem and a Solution

For the reasons described above, a touchscreen computer monitor based devices, with its significant and above noted manufacturing cost advantages, is not suitable as the large board component of a 'Dynavision™ like' visual motor reaction evaluation and training device, due to the potential of damage to the touch screen from hard strikes to the touch screen, and because the touch screen does not present the user with three dimensional target button(s). This invention teaches how the use of a standard touch screen monitor (with the above described cost saving benefits) can be incorporated as the large board component of a 'Dynavision™ like' visual motor reaction and training device that still presents the user with illuminated 3 dimensional target buttons; without creating the potential for damage to the touchscreen from hard strikes to the target buttons(s), by the user of the device.

BRIEF DESCRIPTION OF THE INVENTION

This invention teaches how the use of a standard touch screen monitor (with the above described cost saving benefits) can be incorporated as the large board component of a 'Dynavision™ like' visual motor reaction evaluation and training device that still presents the user with illuminated 3 dimensional target buttons; without creating the potential for damage to the touch screen from hard strikes to the target button(s), by the user of the device.

BRIEF DESCRIPTION OF THE DRAWINGS

This invention is comprised of a Case 100, see Drawing Sheet 1 of 4 (1/4) and Drawing Sheet 2 of 4 (2/4) into which a commercially available touchscreen computer monitor 108 can be placed and secured and the opening 105 in the Face of the Case 100 through which a portion of the screen of the touch screen computer (within the Case) can be seen.

Drawing FIG. 2 of 4 (2/4); also shows an 'exploded view' of the Case 100, including the Face of the Case 101; and the Rectangular Touch Screen Monitor 108 shown in both vertical and horizontal orientation within the Case.

Figure 1:
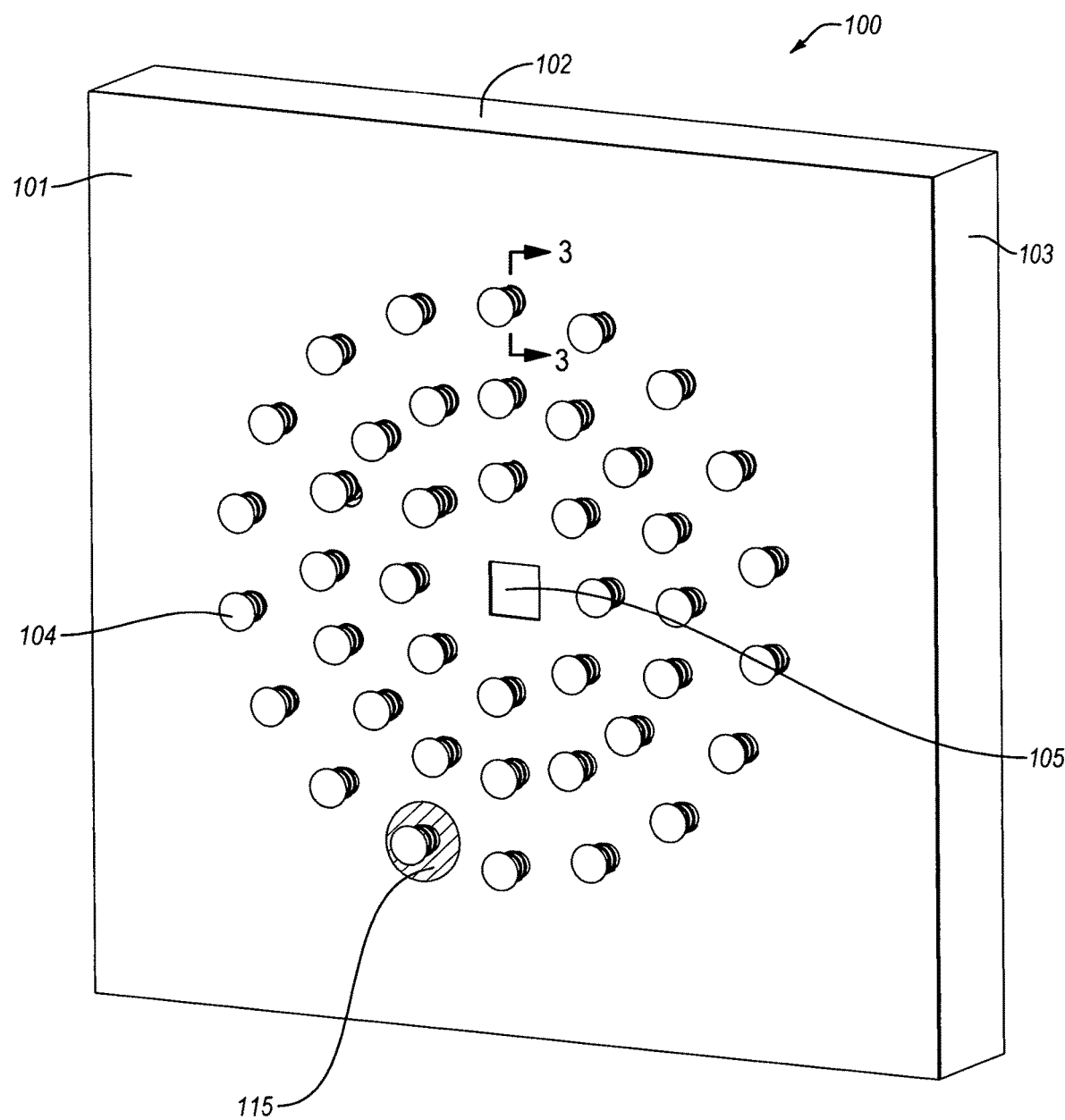
Figure 2:
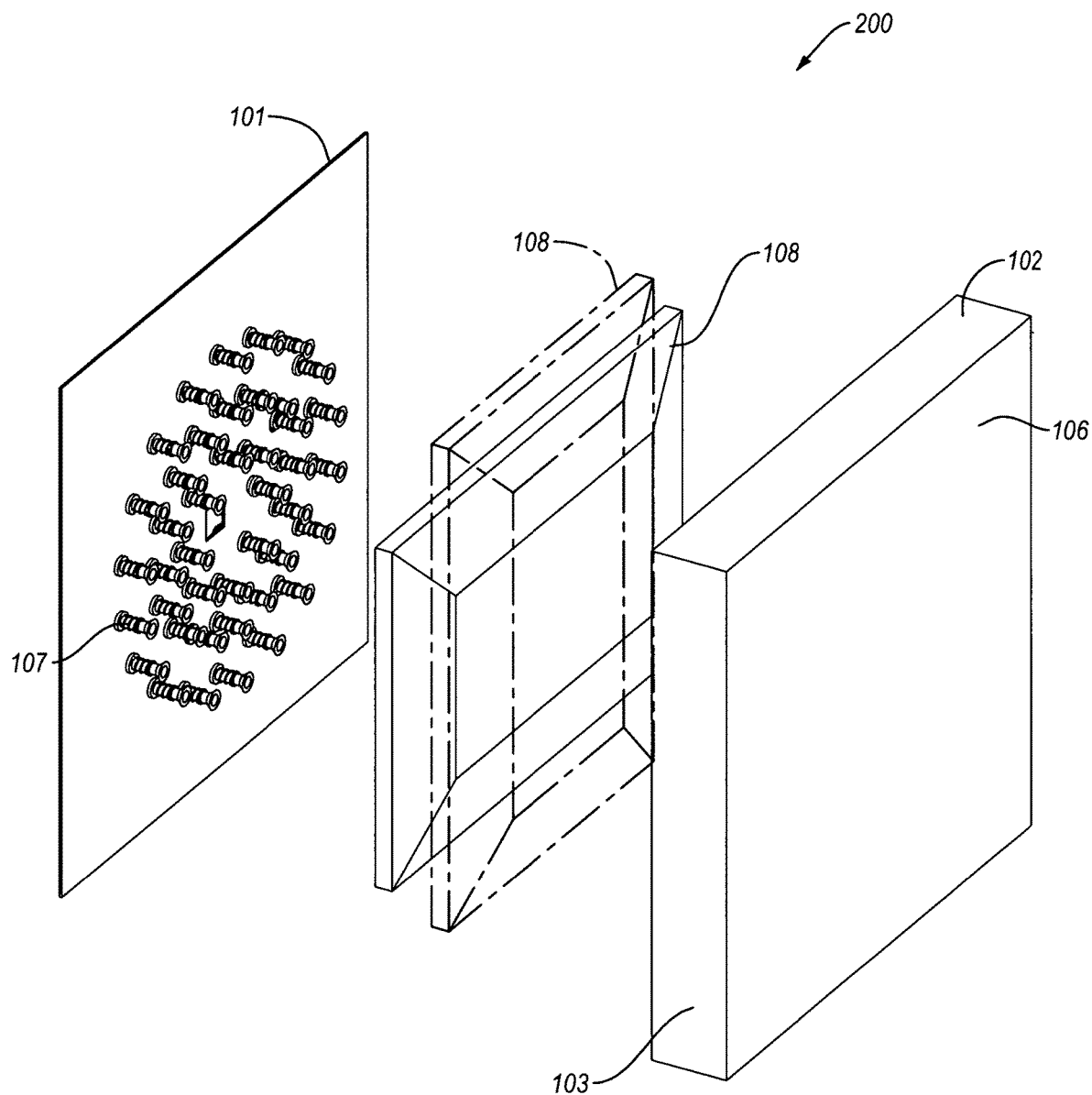
Figure 3:
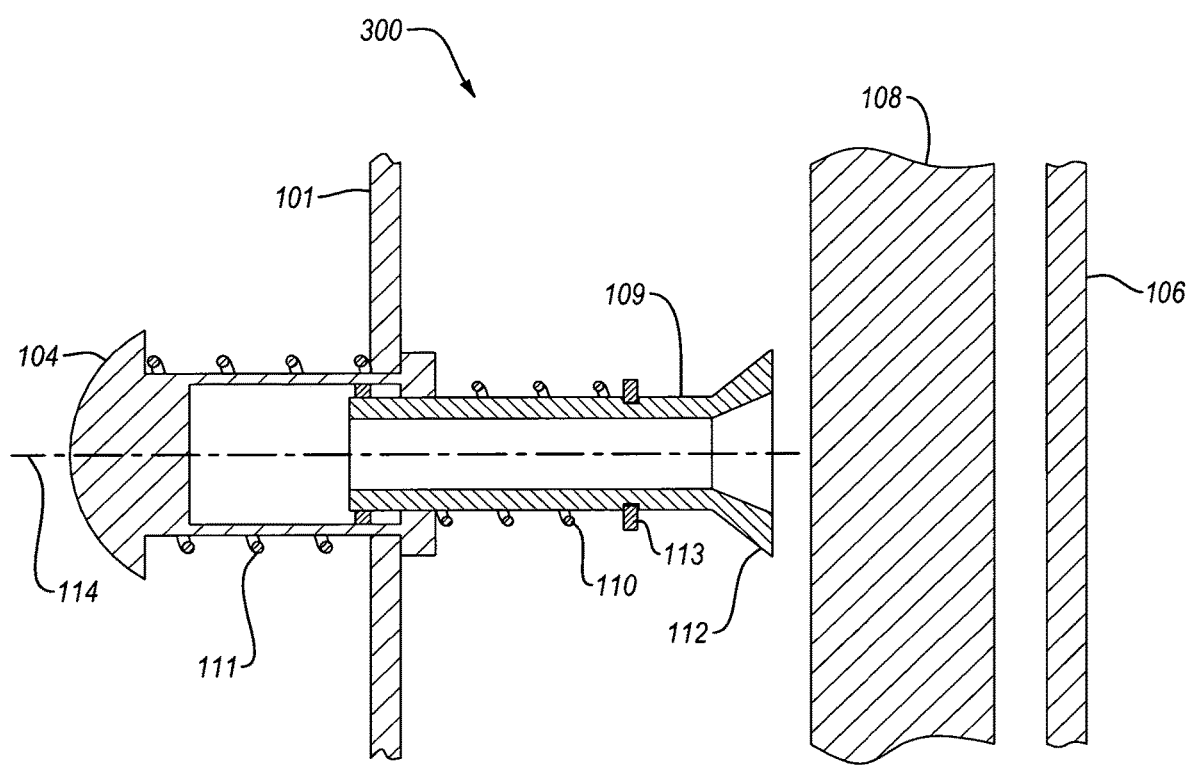
Figure 4:
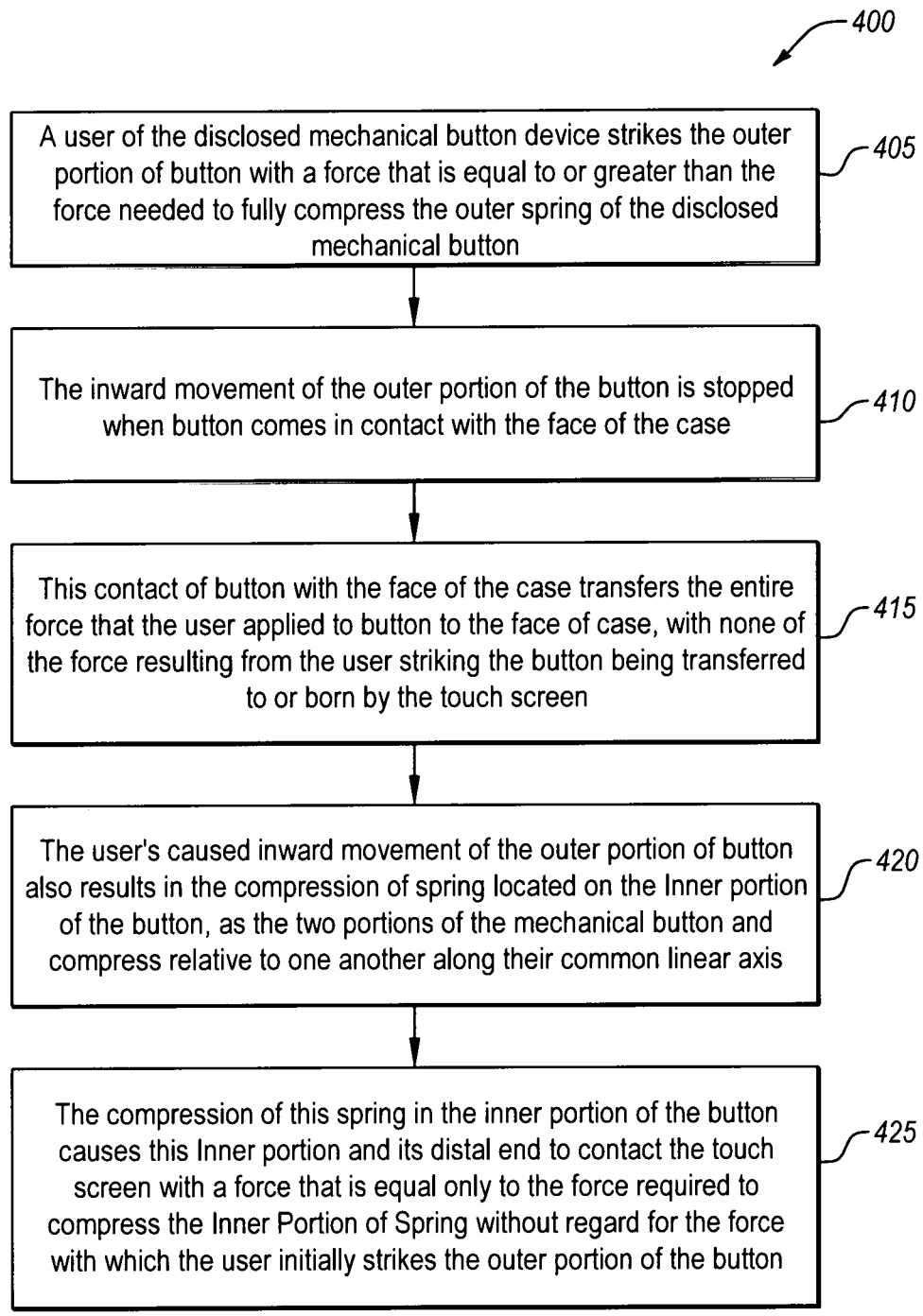

Drawing Sheet 3 of 4 (3/4) shows the mechanical Button that is secured to the face of the CASE 101; and not secured to the face of the touchscreen 108.

Drawing Sheet 4 of 4 (4/4) is a 5 step Flow Chart describing the operation of the herein disclosed mechanical Button. It is suggested that this Drawing Sheet 4/4 be reviewed with Drawing Sheet 3 of 4 (3/4) at hand.

DETAILED DESCRIPTION OF THE 4 DRAWING SHEETS

Drawing Sheet 1 of 4 (1/4) shows; Case 100; 101, Face of Case; 102, Top Side of Case; 103, Right Side of Case; 104, Outer Portion of the Button; 105, the opening in the Face of the Case 100 through which a portion of the of the screen of the touch screen computer (within the Case) can be seen; 115, a ridged, translucent area in the 101 Face of the Case surrounding a Button;

Drawing Sheet 2 of 4 (2/4) shows 106, Back of Case; 107, Inner-portion of the Button; 108, Rectangular touch screen computer monitor as positioned within the Case, shown in both horizontal and vertical (dotted line) orientations. For # s, 100, 101, 102, and 103 on this Drawing Sheet 2 of 4 (2/4) see paragraph [0029], above.

Drawing Sheet 3 of 4 (3/4); 101, Face of the Case; 104, Outer Portion of the Button; 106, Back of the Case; 108, Computer Touch Screen; 109, Inner-portion of the Button; 110, Spring on the Inner portion of the Button; 111, Spring on the Outer portion of the Button; 112, simple optical lens, 113, Spring stop; 114, the liner axis of the Button;

Drawing Sheet 4 of 4; is a 5 Step Flow Chart describing an example of operation of the disclosed Button.

ELEMENTS OF THE DRAWINGS SHEETS DESCRIBED IN NUMERICAL ORDER

100 is an illustration of the front view of the Case into which the touch screen computer monitor is located.

101 is the Face of Case 100.

102 is the top side of Case 100.

103 is the right side of Case 100.

104 is an illustration of the Outer Portion of the Button; i.e. the portion of the Button that is closest to the user of the device and that is the portion of the Button that is contacted by the user when he/she presses or strikes the Button.

105 is the opening on the face of the Case through which the user can see information displayed by the touch screen computer in the Case.

106 is the back side of case 100.

107 is the Inner-portion of the Button that is furthest from the user of the device and the portion of the Button that contacts the face of touch screen computer when the outer portion of the Button 104, is pressed by the user. This Button is further illustrated in Drawing Sheet 3 of 4 (3/4); showing both the outer 104 and inner 109 portions of button 300.

108 is the rectangular touch screen computer monitor as positioned within the Case, shown in both horizontal and vertical (dotted line) orientations.

109 is further detail of the Inner-portion of Button 200 showing the spring 110 of the inner portion of the Button; 111, the spring located on the Outer-portion of the Button and the simple optical lens 112 and the spring stop 113 located on the inner portion of the Button.

110 is the Spring located on the Inner-portion of the Button.

111 is the Spring located on the Outer-portion of the Button.

112 is the Simple optical Lens on end of the Inner Portion of the Button to increase light collection into and through the Button from the illuminated area of the touch screen monitor.

113 is a Spring Stop on the Inner portion of the Button;

114 shows the Linier Axis of the Button running the length of the Button from 104, the outer portion of the button, to 112, the Inner Portion of the Button, through the center line of the Button.

115 is a rigid, translucent area of the Face 101 of the Case 100, surrounding the outer portion of a Button.

DETAILED DESCRIPTION OF THE INVENTION

Example of Operation of Disclosed Mechanical Button. The Case 100, see Drawing 1/4, is made of strong, light weight, rugged, rigid materials, such as aluminum, plastic, steel; with a Front Side or Face Side 101 Side, Back Side 106 (Drawing 2/4); Right and Left Sides, 103 and Top and Bottom Sides 102. The Case is sized to the dimensions of a commercially available touchscreen computer monitor of choice; such that the inside dimensions of the Case are larger than the outer dimensions of the computer monitor; allowing the monitor to be placed into the Case and firmly secured within the Case with the touchscreen face of the monitor facing the inside Front Side of the Case, see Drawing 2/4. Further, a viewable window 105 is created in a central area of the Front Side of the Case, such that information displayed on that portion of the touchscreen is readily visible to the user of the device through this viewable window.

In an alternate configuration of the above described Case to support the Button(s), the integral ridged sides of the touch screen unit itself, beyond the outer edges of the face of the Touch Screen, can also serve as the Sides of the Case to support the Face 101 of the previously described Case. In another alternate configuration, the Case 100 may have only a Face and Sides, without a Back Side 106 on the Case; where the wall of a room or other support structure behind the Touch Screen functionally serves as the Back Side 106 of the Case by bearing the force from the Face 101 and Sides 103 of the Case. Further, any of the structures of the Case 100 need not be continuous in form, such that intermittent support structures that do not cover the entire surface of the Face, side or back of the Case, may be substituted for the described solid elements of the Case 100, i.e., Face 101, Sides 103 and Back 106.

The Button or Buttons 104 are located on and secured to the Face of the Case and (N.B.) the Button or Buttons are not secured to or supported by the Face of the touch screen, see Drawing Sheet 3 of 4 (3/4) of the Button.

The Button is a mechanical assembly comprised of an Outer Portion 104 that is contacted/struck by the person using the device, causing the Inner Portion of the Button 112 to contact the face of the touchscreen when the Outer Portion 104 of the Button is depressed, such that the movement and force conveyed to the inner portion of the Button by pressure on and movement of the outer portion 104 of the Button by the user is limited by the design of the Button. Specifically, this limited force can be accomplished by having the Outer Portion of the Button 104 slide over or within the Inner Portion of the Button 109 when the Button is depressed, as in a telescope fashion, along the Linier Axis 114 of the Button.

The force to compress spring 111 that is located between the Face of the Case 101 and the Outer Portion of the button 104 is the force required for the user to fully depress the Outer-Button 104, and the compression force of spring 110 between the Outer Portion of the Button and the Inner Portion of the Button results in the force with which the Inner Portion of the Button presses upon the face of the touchscreen 108. Thus, by prudent selection of Inner-Button spring 110 with a compression force less than a force that would cause damage to the touch screen, the force with which the Inner Portion of the Button 112 presses upon the face of the touchscreen is always within the safe range for such forces, without regard to the amount of force applied to the Outer Portion of Button 104 by the user when striking this Outer Portion of the Button. This occurs because once the outer Button 104 comes in contact with the Face of the Case 101, all force that is placed on the outer portion of the Button 104, including the force necessary to fully compress the outer spring 111 plus any additional force exerted by the user when striking the Outer Button 104 is transferred to the Face of the Case, and in-turn transferred to the Sides and Back of the Case and, importantly, that force is not transferred to the face of the Touch Screen.

This operation of the disclosed Button is further described in "5 Step Flow Chart" drawing sheet number 4 (4/4).

The disclosed Button is made of transparent or light transmitting material or hollow tube, such as clear acrylic plastic and positioned such that the light from an illuminated area of the touch screen that is aligned in the Case with the location of the Button causing the Button to be illuminated.

In an alternate configurations, the Button may also be electrically conductive, such that the body capacitance of the user's body triggers the touchscreen when the Button is depressed and touches the screen.

To achieve this conductivity; plastic parts of the Button can be treated with commercially available clear conductive coatings to achieve the above described function. Light transmission through the Button may also be achieved and improved by having a hole running the length of the Button assembly.

To insure that striking the Button with an object (ball) triggers the touchscreen, the conductive Buttons can be electrically connected to the Case and in turn to a common very low voltage source (e.g., 9 Volt battery) to provide an assured change in capacitance when the conductive Buttons touches the screen.

The Button may also include a simple optical lens 112 at the termination of the Inner Portion of the Button. This lens will assist in collecting and focusing the light from the illuminated area of the touchscreen onto the Button assembly, to increase the brightness of the Button when viewed by a user. In addition an area of the Face of the Case 115 surrounding a Button may be of rigid translucent material, such as clear polycarbonate plastic, allowing light from the illuminated area of the touch screen monitor to be visible to the user around the Button, further designating the specific Button to be addressed/pressed by the user.

The Learn Program is a software algorithm that causes a lighted area/dot of light on the touchscreen to be created and positioned where a Button makes contact with the touchscreen and to memorize that position on the touchscreen. This is a simple variation on the common and well understood touch screen practice of creating the illumination of a touch screen where it is touched by a user. Thus, the Learn Program allows the controlling computer to know exactly where to create the illuminated areas on the touchscreen, such that the illuminated areas on the touchscreen are directly aligned with the location of the Button(s) that are attached to the Front Side of the Case 101. This direct method of learned alignment eliminates the need to measure, map out and transfer the BUTTON locations on the Front Side of the CASE to the face of the touchscreen. This also facilitates the interchange use of touchscreen monitors that are of a different size or length/width aspect ratio. While this LEARN PROGRAM is a desirable feature, the useful operation of this invention is not dependent upon this feature, as the proper and correct location of the BUTTON(s) in the face of the CASE may be simply accomplished by copying the programmed location of the illuminated areas of the touchscreen onto the face of the CASE 100 and therein placing the BUTTONS 104.

Examples of Preferred Operation of the Invention a. The commercially available touchscreen computer monitor is secured within a Case 100 (see Drawing Sheets 1 of 4 (1/4) and 2 of 4 (2/4) of an appropriate size to accommodate the chosen touch screen monitor.

b. The controlling computer is placed in its normal user/run mode and a random area of the touchscreen illuminates behind one of the Buttons, illuminating that Button.

c. The user is presented with an illuminated, raised, 3 dimensional mechanical button per drawing sheet 1 of 4 (1/4) and he/she strikes the Outer Portion 104 of the Button 200, receiving tactile feedback.

d. The force of the impact of the user striking the Outer Portion of Button 104 is delivered to the Face of the case 101 when the Button 104 comes in contact with the Face of the Case 101 and the Inner-Portion of Button 112 contacts the touchscreen of the monitor with a known, safe and appropriate force, based on and limited to the compression force of Spring 110.

f. The computer controlling the device senses the contact of the inner button 112 with the touch screen described above and turns off the illuminated area behind that Button and immediately illuminates an area behind another randomly selected Button.

Alternate Methods for Achieving a 'Button' with Described Features and Benefits

In addition to the Button 300 described above and illustrated in Drawing Sheet 3/4, there are alternate methods and designs for achieving the unique function of the Button wherein the same force that the user exerts on the Outer Portion 104 of the Button does not transfer to the inner Portion 109 and 112 of the Button that contacts the touchscreen of the monitor; but rather, the Inner Portion of the Button exerts an equal or lesser force on the touchscreen than the force that the user exerts on the Outer Portion 104 of the Button and such force applied by the user to the Outer Portion 104 of the Button is born by the Front and Side of the Case.

One such alternate method of achieving the above described performance is to construct the Button with an Outer Portion 104 that is of ridged, conductive, light transmitting material and an Inner Portion 109 that is attached to the Outer Portion and where the Inner Portion is constructed of a flexible, conductive, compressible material, such as foam plastic, rubber, silicone or a coil spring, rather than being constructed of a ridged material.

In this above alternate method of construction the total needed inward travel of the Button when depressed by the user is a function of the combined length of the outer 104 and Inner 109 portions of the Button, when modified as described above. Thus, and by example, if the distance from the Front Side of the Case 101 to the surface of the touchscreen 108 is 1", the forward travel of the entire Button would need to be greater than 1", including the length of the compressible (or flexible) Inner Portion of the Button. This configurations assures that the flexible or compressible portion of the Inner Portion of the Button 109 will contact the touchscreen when the Outer Portion 104 of the Button is fully depressed, and while in doing so, limit the force applied to the touchscreen by the Button because the force applied to the Outer Portion of the Button 104 by the user of the device, that is in excess of the force required to compress spring 111 or to compress the above described alternate construction of the inner portion of the Button, is transferred to the Face of the Case by the contact of the Outer portion of Button 104 with the Face of the Case; and such force is therefore not transferred to the face of the Touch Screen. As a result, the only force bearing on the face of the touch screen 108 is the force required to compress the above described compressible distal portion of the Inner Portion of the Button 109 that exceeds the length of the above described necessary travel of the Button (>1" in, this example) when pressed by the user.

What is claimed:

1. A herein disclosed enclosure Case 100 for a touch screen device where the enclosure Case includes at least one herein disclosed mechanical button device secured to the face 101 of the enclosure Case (see Drawing Sheets 1 of 4 and 2 of 4) that allows a user of the touch screen to activate the touchscreen by forcefully striking the herein disclosed mechanical button 104, without causing damage to the touch screen device within the enclosure Case and where such mechanical button is not secured to or supported by the face of the touchscreen device 108, and where the disclosed mechanical button device is comprised of at least 2 sections that can be caused to be compressed relative to one another along their common linier axis 114 when the portion of the Button 104 closest to the user is depressed or struck by the user and the opposite (inner) end of said mechanical button 112 is caused, by such user pressing action on the outer portion of said Button, to make contact with the face of the touchscreen, activating the touch screen, wherein face of the case includes an opening 105 through which a portion of the touch screen displaying information to a user can be seen, and the said mechanical button device is supported within the enclosure Case by one or more rigid structure that is/are parallel to the face of the touchscreen and where such rigid structure is not supported by the face of the touchscreen 108, wherein the rigid structure allows light from an illuminated area of the touch screen to be visible to the user.

2. The device of claim 1, where the disclosed mechanical button device is constructed with a compressible and resilient spring or compressible and resilient material that is located between the user's side of the mechanical device 104 and the rigid structure 101 of claim 1, and the same said device with a compressible and resilient spring or compressible and resilient material between the first 104 and second 109 sections of the said mechanical device, such that the force required to compress the inner portion of the device 109 when it comes in contact with the screen is equal to or less than the force applied by the user to compress the outer portion 104 of the device to cause the outer portion to come in contact with the rigid structure of claim 1.

3. The device of claim 2 where the mechanical button device is constructed with a compressible and resilient spring or compressible and resilient material that is located between the inner end of the Mechanical Button 109 and the face of the Touch Screen 108 such that the force required to compress this compressible and resilient spring or compressible and resilient material when it comes in contact with the face of the Touch Screen 108 is equal to or less than the force applied by the user to compress the outer portion of the device to cause this outer portion 104 to come in contact with the rigid structure of claim 1.

* * * * *